United States Patent
Zhang et al.

(10) Patent No.: US 11,197,094 B2
(45) Date of Patent: Dec. 7, 2021

(54) NOISE REDUCTION METHOD AND APPARATUS BASED ON IN-VEHICLE SOUND ZONES, AND MEDIUM

(71) Applicant: BEIJING BAIDU NETCOM SCIENCE AND TECHNOLOGY CO., LTD., Beijing (CN)

(72) Inventors: Tengfei Zhang, Beijing (CN); Long Zhang, Beijing (CN); Qie Yin, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/029,923

(22) Filed: Sep. 23, 2020

(65) Prior Publication Data

US 2021/0297776 A1    Sep. 23, 2021

(30) Foreign Application Priority Data

Mar. 17, 2020 (CN) .......................... 202010188707.5

(51) Int. Cl.
| | |
|---|---|
| H04R 3/04 | (2006.01) |
| H04R 5/04 | (2006.01) |
| G10L 21/0208 | (2013.01) |
| B60R 11/02 | (2006.01) |
| G10L 15/08 | (2006.01) |

(52) U.S. Cl.
CPC ............ H04R 3/04 (2013.01); B60R 11/0247 (2013.01); G10L 15/08 (2013.01); G10L 21/0208 (2013.01); H04R 5/04 (2013.01); G10L 2015/088 (2013.01); G10L 2021/02082 (2013.01); H04R 2499/13 (2013.01)

(58) Field of Classification Search
None
See application file for complete search history.

(56) References Cited

U.S. PATENT DOCUMENTS

| | | | |
|---|---|---|---|
| 2017/0213541 A1* | 7/2017 | MacNeille | G10K 11/17881 |
| 2019/0073999 A1* | 3/2019 | Premont | G10L 15/08 |
| 2021/0151026 A1* | 5/2021 | Jain | G10K 11/17817 |

* cited by examiner

*Primary Examiner* — Paul W Huber
(74) *Attorney, Agent, or Firm* — Lathrop GPM LLP

(57) ABSTRACT

The present disclosure discloses a noise reduction method and apparatus based on in-vehicle sound zones and a medium. The method includes: determining, based on voice signals obtained by sound zones, a target sound zone to which a voice signal waking up a vehicle-mounted terminal belongs, in which each sound zone has a corresponding noise reduction module; and sending a noise reduction termination instruction to noise reduction modules of sound zones other than the target sound zone, in which the noise reduction termination instruction is configured to instruct the noise reduction modules of the sound zones other than the target sound zone to terminate noise reduction algorithms in a process of performing voice interaction for the target sound zone.

15 Claims, 2 Drawing Sheets

---

S101
determining, based on voice signals obtained by sound zones, a target sound zone to which a voice signal waking up a vehicle-mounted terminal belongs, wherein each sound zone has a corresponding noise reduction module S102
sending a noise reduction termination instruction to noise reduction modules of sound zones other than the target sound zone, wherein the noise reduction termination instruction is configured to instruct the noise reduction modules of the sound zones other than the target sound zone to terminate noise reduction algorithms in a process of performing voice interaction for the target sound zone

NOISE REDUCTION METHOD AND APPARATUS BASED ON IN-VEHICLE SOUND ZONES, AND MEDIUM

CROSS-REFERENCE TO RELATED APPLICATION

The present application is based upon and claims priority to Chinese Patent Application No. 202010188707.5, filed on Mar. 17, 2020, the entire contents of which are incorporated herein by reference.

FIELD

The present disclosure relates to a field of computer technologies, especially to a noise reduction technology, and specifically, to a noise reduction method and apparatus based on in-vehicle sound zones, and a non-transitory computer-readable medium.

BACKGROUND

With the development of the Internet and intelligent terminals, the use of intelligent vehicles has become more and more widespread. Drivers or passengers can interact with vehicle-mounted terminals through voice to realize operations such as playing music or navigation. In order to accurately perform speech recognition and interaction, a vehicle is usually divided into several sound zones. A sound zone to which a user that wakes up a vehicle-mounted terminal belongs is recognized first, and then recognition and interaction are performed based on voice of the user, thereby reducing the impact of voice data from other sound zones on the speech recognition.

In a scene where the vehicle is divided into four sound zones, there are four microphones to obtain the voice from the user, an echo reference signal and ambient noise. Correspondingly, each microphone corresponds to a noise reduction algorithm to eliminate the echo reference signal and the ambient noise.

SUMMARY

Embodiments of the present disclosure provide a noise reduction method and apparatus based on in-vehicle sound zones, and a non-transitory computer-readable medium.

Embodiments of the present disclosure provide a noise reduction method based on in-vehicle sound zones, including: determining, based on voice signals obtained by sound zones, a target sound zone to which a voice signal waking up a vehicle-mounted terminal belongs, in which each sound zone has a corresponding noise reduction module; and sending a noise reduction termination instruction to noise reduction modules of sound zones other than the target sound zone, in which the noise reduction termination instruction is configured to instruct the noise reduction modules of the sound zones other than the target sound zone to terminate noise reduction algorithms in a process of performing voice interaction for the target sound zone.

Embodiments of the present disclosure provide a noise reduction apparatus based on in-vehicle sound zones, including: one or more processors; a memory storing instructions executable by the one or more processors; in which the one or more processors are configured to: determine, based on voice signals obtained by sound zones, a target sound zone to which a voice signal waking up a vehicle-mounted terminal belongs, in which each sound zone has a corresponding noise reduction module; and send a noise reduction termination instruction to noise reduction modules of sound zones other than the target sound zone, in which the noise reduction termination instruction is configured to instruct the noise reduction modules of the sound zones other than the target sound zone to terminate noise reduction algorithms in a process of performing voice interaction for the target sound zone.

Embodiments of the present disclosure provide a non-transitory computer-readable storage medium having a computer instruction stored thereon. The computer instruction is configured to make a computer perform a noise reduction method based on in-vehicle sound zones according to embodiments of the present disclosure. The method includes: determining, based on voice signals obtained by sound zones, a target sound zone to which a voice signal waking up a vehicle-mounted terminal belongs, in which each sound zone has a corresponding noise reduction module; and sending a noise reduction termination instruction to noise reduction modules of sound zones other than the target sound zone, in which the noise reduction termination instruction is configured to instruct the noise reduction modules of the sound zones other than the target sound zone to terminate noise reduction algorithms in a process of performing voice interaction for the target sound zone.

Other effects of the above optional implementations will be described below in combination with specific embodiments.

BRIEF DESCRIPTION OF THE DRAWINGS

The accompanying drawings are used for a better understanding of the solution, and do not constitute a limitation to the present disclosure.

DETAILED DESCRIPTION

Exemplary embodiments of the present disclosure are described below with reference to the accompanying drawings, which include various details of the embodiments of the present disclosure to facilitate understanding, and should be considered as merely exemplary. Therefore, those skilled in the art should recognize that various changes and modifications may be made to the embodiments described herein without departing from the scope and spirit of the present disclosure. Also, for clarity and conciseness, descriptions of well-known functions and structures are omitted in the following description.

Figure 1:
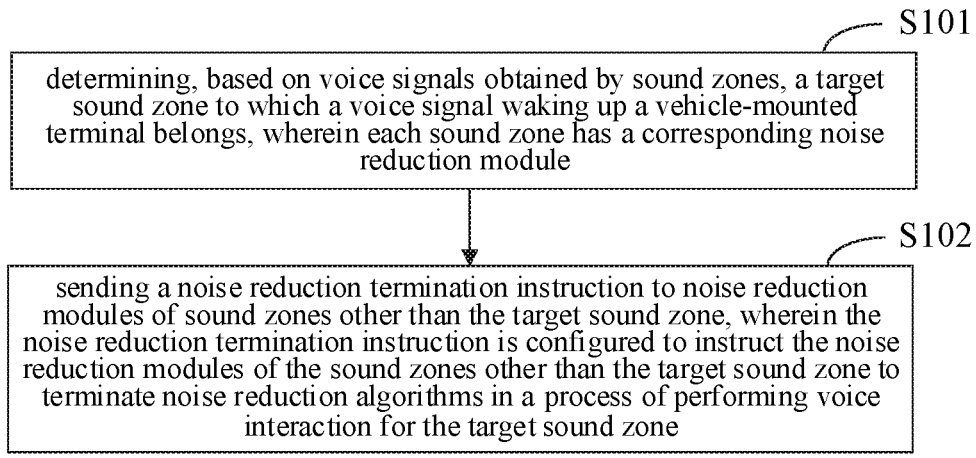
FIG. 1 is a flowchart of a noise reduction method based on in-vehicle sound zones according to Embodiment 1 of the present disclosure.

FIG. 1 is a flowchart of a noise reduction method based on in-vehicle sound zones according to Embodiment 1 of the present disclosure. The embodiment may be applied to a situation where noise reduction is performed during a voice interaction process based on in-vehicle sound zones, for example, four in-vehicle sound zones. The method may be implemented by a noise reduction apparatus based on in-vehicle sound zones. The apparatus is implemented by software and/or hardware, and is preferably configured in an electronic device, such as a vehicle-mounted terminal. As illustrated in FIG. 1, the method includes the following.

At block S101, a target sound zone to which a voice signal waking up a vehicle-mounted terminal belongs is determined based on voice signals obtained by sound zones. Each sound zone has a corresponding noise reduction module.

Take the four in-vehicle sound zones as an example. Each sound zone in the vehicle is provided with a microphone and other pickup devices to obtain a voice signal from a user. Each sound zone corresponds to a noise reduction module configured to perform noise reduction on a voice signal obtained from the sound zone, for example, to eliminate an echo reference signal or ambient noise. Under normal circumstances, the noise reduction algorithms of the four noise reduction modules run at the same time, and the voice signal obtained will be denoised in real time. Consequently, the central processing module (CPU) will be required to perform many operations are once, causing the CPU to consume a lot of energy.

According to the division of the in-vehicle sound zones, it is possible to locate the sound zone to which the voice signal that wakes up the vehicle-mounted terminal belongs each time. And then, speech recognition is performed on the voice signal obtained from the sound zone, and voice interaction is performed based on a result of the speech recognition. Therefore, in the embodiment of the present disclosure, after the vehicle-mounted terminal is woken up, the vehicle-mounted terminal determines the target sound zone to which the voice signal waking up the vehicle-mounted terminal belongs based on the voice signals obtained by the sound zones.

It should be noted that when a user speaks in the vehicle, all of the microphones in the sound zones may obtain the voice signal. However, since distances from the location of the user speaking to the microphones in the sound zones are different from each other, voice signals acquired by the microphones are different. By adopting a sound zone decision algorithm, the target sound zone to which the voice waking up the vehicle-mounted terminal belongs may be determined based on the voice signals obtained by the sound zones. The embodiment of the present disclosure may adopt any sound zone decision algorithm in the prior art to determine the target sound zone, and the embodiment of the present disclosure does not make any limitation on the specific content of the sound zone decision algorithm.

At block S102, a noise reduction termination instruction is sent to noise reduction modules of sound zones other than the target sound zone. The noise reduction termination instruction is configured to instruct the noise reduction modules of the sound zones other than the target sound zone to terminate noise reduction algorithms in a process of performing voice interaction for the target sound zone.

The noise reduction algorithms of the noise reduction modules run at the same time, which causes a high CPU occupancy rate. Therefore, according to the embodiment of the present disclosure, after the target sound zone is determined, only the noise reduction module corresponding to the target sound zone is allowed to run the noise reduction algorithm, and the noise reduction termination instruction is sent to the noise reduction modules of the sound zones other than the target sound zone so as to instruct the noise reduction modules of the sound zones other than the target sound zone to terminate the noise reduction algorithms in the process of voice interaction for the target sound zone.

It is understandable that when the voice signal that wakes up the vehicle-mounted terminal belongs to the target sound zone, it is indicated that the user in the target sound zone is planning to perform voice interaction with the vehicle-mounted terminal. Therefore, recognition and interaction are only needed to be performed on the voice signal from the target sound zone while the noise reduction algorithms of the noise reduction modules of the sound zones other than the target sound zone are terminated. Consequently, the CPU occupancy rate may be reduced without affecting the speech recognition and voice interaction in the target sound zone.

In addition, after the target sound zone is determined, the vehicle-mounted terminal activates the speech recognition engine of the vehicle-mounted terminal to perform speech recognition on the voice signal from the target sound zone.

With the technical solution of the embodiment of the present disclosure, by maintaining the normal operation of the noise reduction algorithm of the target sound zone, and temporarily terminating the noise reduction algorithms of other sound zones, the CPU consumption is reduced without affecting speech recognition and interaction, avoiding a slow running speed of the vehicle-mounted terminal.

Figure 2:
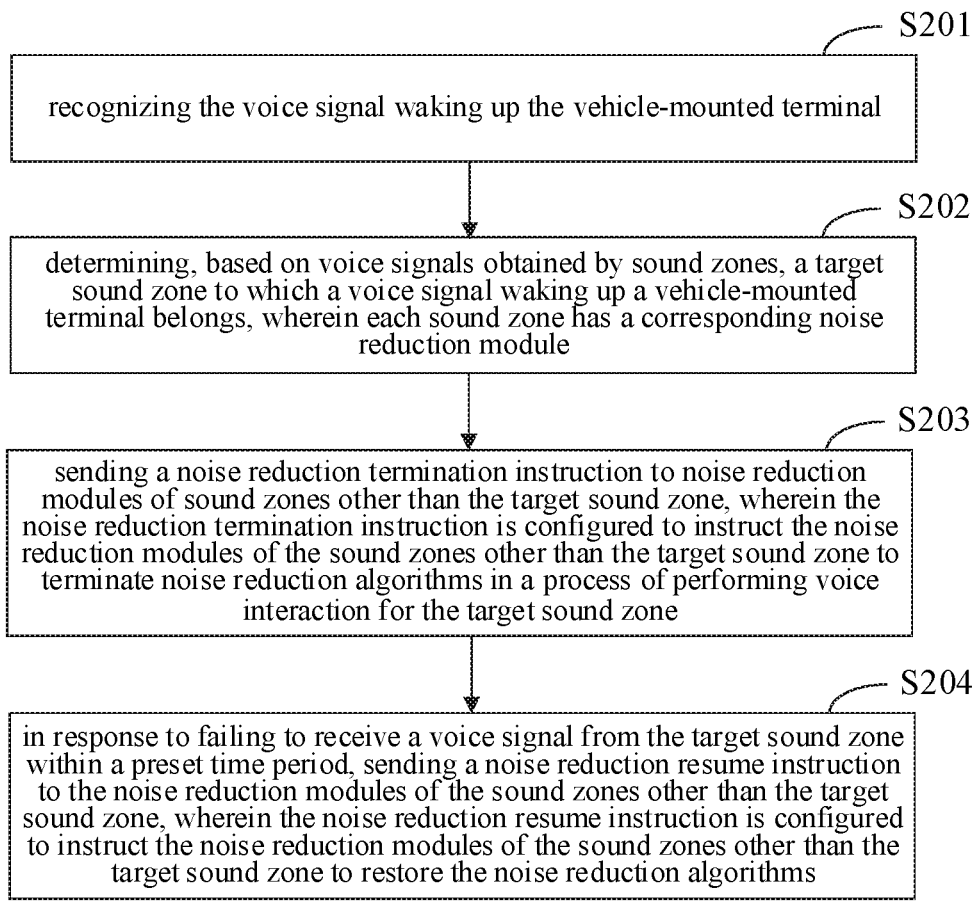
FIG. 2 is a flowchart of a noise reduction method based on in-vehicle sound zones according to Embodiment 2 of the present disclosure.

FIG. 2 is a flowchart of a noise reduction method based on in-vehicle sound zones according to Embodiment 2 of the present disclosure. Embodiment 2 is optimized on the basis of the foregoing embodiment. As illustrated in FIG. 2, the method includes the following.

At block S201, the voice signal waking up the vehicle-mounted terminal is recognized.

The vehicle-mounted terminal needs to be woken up by the user before performing voice interaction with the user. Generally, a wake-up word may be preset. Voice obtained in real time may be matched with the wake-up word through keyword matching. If the voice obtained in real time matches with the wake-up word, it indicates that the user is waking up the vehicle-mounted terminal.

According to the embodiment of the present disclosure, it is recognized whether the vehicle-mounted terminal is woken up. When it is recognized that the vehicle-mounted terminal is woken up, the target sound zone is recognized, and accordingly, the noise reduction modules are turned off and restored to avoid unnecessary operations and to ensure the normal operation of the noise reduction modules.

At block S202, a target sound zone to which a voice signal waking up a vehicle-mounted terminal belongs is determined based on voice signals obtained by sound zones. Each sound zone has a corresponding noise reduction module.

At block S203, a noise reduction termination instruction is sent to noise reduction modules of sound zones other than the target sound zone. The noise reduction termination instruction is configured to instruct the noise reduction modules of the sound zones other than the target sound zone to terminate noise reduction algorithms in a process of performing voice interaction for the target sound zone.

At block S204, in response to failing to receive a voice signal from the target sound zone within a preset time period, a noise reduction resume instruction is sent to the noise reduction modules of the sound zones other than the target sound zone. The noise reduction resume instruction is configured to instruct the noise reduction modules of the sound zones other than the target sound zone to restore the noise reduction algorithms.

Terminating the noise reduction algorithms of other sound zones and maintaining the operation of the noise reduction algorithm of the noise reduction module of the target sound zone are implemented in the process of voice interaction for the target sound zone. When the target sound zone no longer generates a voice signal, it indicates that the current voice interaction process has ended. In the embodiment of the present disclosure, it may be determined that the voice interaction process has ended when the voice signal from the target sound zone is not received within the preset time period. The preset time period is pre-configured by a technician, and there is no limitation here.

After the voice interaction process is over, it is impossible to predict which sound zone the next voice interaction will be for. Therefore, in the embodiment of the present disclosure, in response to failing to receive the voice signal from the target sound zone within the preset time period, the noise reduction resume instruction is sent to the noise reduction modules of the sound zones other than the target sound zone to instruct the noise reduction modules of the sound zones other than the target sound zone to restore the noise reduction algorithms. In this manner, when the vehicle-mounted terminal is woken up the next time, the vehicle-mounted terminal re-recognizes a new target sound zone and sends the noise reduction termination instruction to noise reduction modules of sound zones other than the new target sound zone. When the voice interaction process of the new target sound zone is over, the noise reduction resume instruction is sent to the noise reduction modules of the sound zones other than the new target sound zone. By analogy, each time the vehicle-mounted terminal is woken up, the above operations are repeated. Consequently, not only the current voice interaction process will not be affected, but also the next voice interaction process. In addition, the CPU occupancy rate may be reduced.

With the technical solution of the embodiment of the present disclosure, by maintaining the normal operation of the noise reduction algorithm of the target sound zone, and temporarily terminating the noise reduction algorithms of other sound zones, the CPU consumption is reduced without affecting speech recognition and interaction, avoiding a slow running speed of the vehicle-mounted terminal. In addition, when no voice signal appears in the target sound zone, it indicates that the voice interaction based on the target sound zone has ended. At this time, the noise reduction modules of the sound zones except the target sound zone may be restored to ensure that when voice from another sound zone wakes up the vehicle-mounted terminal, the voice signal from another sound zone may be recognized and interacted normally.

Figure 3:
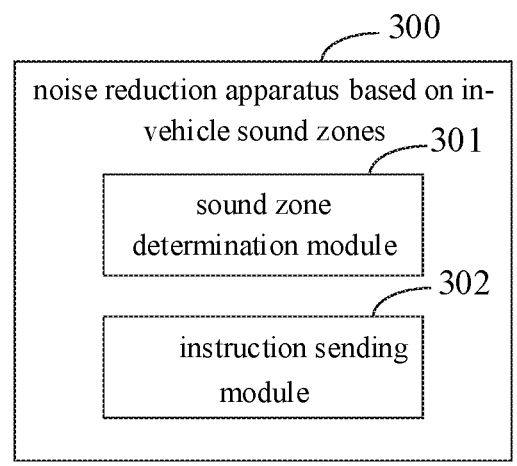
FIG. 3 is a schematic diagram of a noise reduction apparatus based on in-vehicle sound zones according to Embodiment 3 of the present disclosure.

FIG. 3 is a schematic diagram of a noise reduction apparatus based on in-vehicle sound zones according to Embodiment 3 of the present disclosure. The embodiment may be applied to a situation where noise reduction is performed during a voice interaction process based on in-vehicle sound zones, for example, four in-vehicle sound zones. The apparatus may implement the noise reduction method based on in-vehicle sound zones according to any embodiment of the present disclosure. As illustrated in FIG. 3, a noise reduction apparatus 300 based on in-vehicle sound zones includes a sound zone determination module 301 and an instruction sending module 302.

The sound zone determination module 301 is configured to determine, based on voice signals obtained by sound zones, a target sound zone to which a voice signal waking up a vehicle-mounted terminal belongs. Each sound zone has a corresponding noise reduction module.

The instruction sending module 302 is configured to send a noise reduction termination instruction to noise reduction modules of sound zones other than the target sound zone. The noise reduction termination instruction is configured to instruct the noise reduction modules of the sound zones other than the target sound zone to terminate noise reduction algorithms in a process of performing voice interaction for the target sound zone.

Optionally, the sound zone determination module 301 is configured to determine, based on the voice signals obtained by the sound zones, the target sound zone to which the voice signal waking up the vehicle-mounted terminal belongs by adopting a sound zone decision algorithm.

Optionally, the apparatus includes a recognition engine activation module. The recognition engine activation module is configured to, after the sound zone determination module 301 determines the target sound zone, activate a speech recognition engine of the vehicle-mounted terminal.

Optionally, after the noise reduction termination instruction is sent to the noise reduction modules of the sound zones other than the target sound zone, the instruction sending module 302 is configured to, in response to failing to receive a voice signal from the target sound zone within a preset time period, send a noise reduction resume instruction to the noise reduction modules of the sound zones other than the target sound zone. The noise reduction resume instruction is configured to instruct the noise reduction modules of the sound zones other than the target sound zone to restore the noise reduction algorithms.

Optionally, the apparatus includes a wake-up recognition module. The wake-up recognition module is configured to, before the sound zone determination module 301 determines the target sound zone, recognize the voice signal waking up the vehicle-mounted terminal.

The noise reduction apparatus 300 based on in-vehicle sound zones 300 according to the embodiment of the present disclosure may perform the noise reduction method based on in-vehicle sound zones according to any embodiment of the present disclosure, and has corresponding functional modules for performing the method and beneficial effects. For content not described in detail in the embodiment, reference may be made to the description in any method embodiment of the present disclosure.

According to embodiments of the present disclosure, an electronic device and a readable storage medium are provided.

Figure 4:
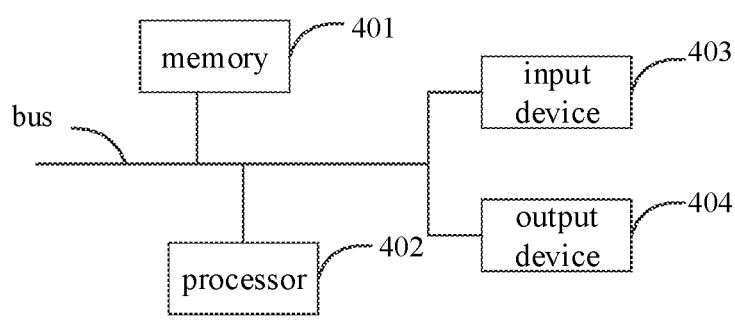
FIG. 4 is a block diagram of an electronic device configured to implement a noise reduction method based on in-vehicle sound zones according to an embodiment of the present disclosure.

FIG. 4 is a block diagram of an electronic device configured to implement a noise reduction method based on in-vehicle sound zones according to an embodiment of the present disclosure. The electronic device is intended to represent various forms of digital computers, such as a laptop computer, a desktop computer, a workbench, a personal digital assistant, a server, a blade server, a mainframe computer and other suitable computers. The electronic device may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the present disclosure described and/or required herein.

As shown in FIG. 4, the electronic device includes: one or more processors 401, a memory 402, and interfaces for connecting various components, including a high-speed interface and a low-speed interface. The components are interconnected by different buses and may be mounted on a common motherboard or otherwise installed as required. The processor may process instructions executed within the electronic device, including instructions stored in or on the memory to display graphical information of the GUI on an external input/output device (such as a display device coupled to the interface). In other embodiments, when necessary, multiple processors and/or multiple buses may be used with multiple memories. Similarly, multiple electronic devices may be connected, each providing some of the necessary operations (for example, as a server array, a group of blade servers, or a multiprocessor system). One processor 401 is taken as an example in FIG. 4.

The memory 402 is a non-transitory computer-readable storage medium according to embodiments of the present disclosure. The memory stores instructions executable by at least one processor, so that the at least one processor executes the noise reduction method based on in-vehicle sound zones provided by the present disclosure. The non-transitory computer-readable storage medium according to the present disclosure stores computer instructions, which are configured to make the computer execute the noise reduction method based on in-vehicle sound zones provided by the present disclosure.

As a non-transitory computer-readable storage medium, the memory 402 may be configured to store non-transitory software programs, non-transitory computer executable programs and modules, such as program instructions/modules (for example, the sound zone determination module 301 and the instruction sending module 302 illustrated in FIG. 3) corresponding to the noise reduction method based on in-vehicle sound zones according to embodiments of the present disclosure. The processor 401 executes various functional applications and performs data processing of the server by running non-transitory software programs, instructions and modules stored in the memory 402, that is, the noise reduction method based on in-vehicle sound zones according to the foregoing method embodiments is implemented.

The memory 402 may include a storage program area and a storage data area, where the storage program area may store an operating system and applications required for at least one function; and the storage data area may store data created based on the use of the electronic device that implements the noise reduction method based on in-vehicle sound zones according to embodiments of the present disclosure, and the like. In addition, the memory 402 may include a high-speed random access memory, and may further include a non-transitory memory, such as at least one magnetic disk memory, a flash memory device, or other non-transitory solid-state memories. In some embodiments, the memory 402 may optionally include memories remotely disposed with respect to the processor 401, and these remote memories may be connected to the electronic device, which is configured to implement the noise reduction method based on in-vehicle sound zones according to embodiments of the present disclosure, through a network. Examples of the network include, but are not limited to, the Internet, an intranet, a local area network, a mobile communication network, and combinations thereof.

The electronic device configured to implement the noise reduction method based on in-vehicle sound zones according to the embodiments of the present disclosure may further include an input device 403 and an output device 404. The processor 401, the memory 402, the input device 403 and the output device 404 may be connected through a bus or in other manners. FIG. 4 is illustrated by establishing the connection through a bus.

The input device 403 may receive input numeric or character information, and generate key signal inputs related to user settings and function control of the electronic device configured to implement the noise reduction method based on in-vehicle sound zones according to the embodiments of the present disclosure, such as a touch screen, a keypad, a mouse, a trackpad, a touchpad, a pointing stick, one or more mouse buttons, trackballs, joysticks and other input devices. The output device 404 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit the data and instructions to the storage system, the at least one input device and the at least one output device.

These computing programs (also known as programs, software, software applications, or codes) include machine instructions of a programmable processor, and may implement these calculation procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor (for example, a magnetic disk, an optical disk, a memory and a programmable logic device (PLD)), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user; for example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include: a local area network (LAN), a wide area network (WAN), the Internet, and a blockchain-based network.

Computer systems may include a client and a server. The client and server are generally remote from each other and typically interact through the communication network. A client-server relationship is generated by computer programs running on respective computers and having a client-server relationship with each other.

With the technical solution according to embodiments of the present disclosure, by maintaining the normal operation of the noise reduction algorithm of the target sound zone, and temporarily terminating the noise reduction algorithms of other sound zones, the CPU consumption is reduced without affecting speech recognition and interaction, avoiding a slow running speed of the vehicle-mounted terminal. In addition, when no voice signal appears in the target sound zone, it indicates that the voice interaction based on the target sound zone has ended. At this time, the noise reduction modules of the sound zones except the target sound zone may be restored to ensure that when voice from another sound zone wakes up the vehicle-mounted terminal, the voice signal from another sound zone may be recognized and interacted normally.

It should be understood that various forms of processes shown above may be reordered, added or deleted. For example, the blocks described in the present disclosure may be executed in parallel, sequentially, or in different orders. As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A noise reduction method based on in-vehicle sound zones, comprising:
   determining, based on voice signals obtained by sound zones, a target sound zone to which a voice signal waking up a vehicle-mounted terminal belongs, wherein each sound zone has a corresponding noise reduction module; and
   sending a noise reduction termination instruction to noise reduction modules of sound zones other than the target sound zone, wherein the noise reduction termination instruction is configured to instruct the noise reduction modules of the sound zones other than the target sound zone to terminate noise reduction algorithms in a process of performing voice interaction for the target sound zone.

2. The method of claim 1, wherein determining, based on the voice signals obtained by the sound zones, the target sound zone to which the voice signal waking up the vehicle-mounted terminal belongs comprises:
   determining, based on the voice signals obtained by the sound zones, the target sound zone to which the voice signal waking up the vehicle-mounted terminal belongs by adopting a sound zone decision algorithm.

3. The method of claim 1, after determining the target sound zone, further comprising:
   activating a speech recognition engine of the vehicle-mounted terminal.

4. The method of claim 1, after sending the noise reduction termination instruction to the noise reduction modules of the sound zones other than the target sound zone, further comprising:
   in response to failing to receive a voice signal from the target sound zone within a preset time period, sending a noise reduction resume instruction to the noise reduction modules of the sound zones other than the target sound zone, wherein the noise reduction resume instruction is configured to instruct the noise reduction modules of the sound zones other than the target sound zone to restore the noise reduction algorithms.

5. The method of claim 1, before determining the target sound zone, further comprising:
   recognizing the voice signal waking up the vehicle-mounted terminal.

6. A noise reduction apparatus based on in-vehicle sound zones, comprising:
   one or more processors;
   a memory storing instructions executable by the one or more processors;
   wherein the one or more processors are configured to:
   determine, based on voice signals obtained by sound zones, a target sound zone to which a voice signal waking up a vehicle-mounted terminal belongs, wherein each sound zone has a corresponding noise reduction module; and
   send a noise reduction termination instruction to noise reduction modules of sound zones other than the target sound zone, wherein the noise reduction termination instruction is configured to instruct the noise reduction modules of the sound zones other than the target sound zone to terminate noise reduction algorithms in a process of performing voice interaction for the target sound zone.

7. The apparatus of claim 6, wherein the one or more processors are configured to:
   determine, based on the voice signals obtained by the sound zones, the target sound zone to which the voice signal waking up the vehicle-mounted terminal belongs by adopting a sound zone decision algorithm.

8. The apparatus of claim 6, wherein the one or more processors are configured to:
   after the sound zone determination module determines the target sound zone, activate a speech recognition engine of the vehicle-mounted terminal.

9. The apparatus of claim 6, wherein the one or more processors are configured to:
   after sending the noise reduction termination instruction to the noise reduction modules of the sound zones other than the target sound zone, in response to failing to receive a voice signal from the target sound zone within a preset time period, send a noise reduction resume instruction to the noise reduction modules of the sound zones other than the target sound zone, wherein the noise reduction resume instruction is configured to instruct the noise reduction modules of the sound zones other than the target sound zone to restore the noise reduction algorithms.

10. The apparatus of claim 6, wherein the one or more processors are configured to:
    before the sound zone determination module determines the target sound zone, recognize the voice signal waking up the vehicle-mounted terminal.

11. A non-transitory computer-readable storage medium having a computer instruction stored thereon, wherein when the computer instruction is executed by a processor of a device, the processor is caused to perform a noise reduction method based on in-vehicle sound zones, comprising:

determining, based on voice signals obtained by sound zones, a target sound zone to which a voice signal waking up a vehicle-mounted terminal belongs, wherein each sound zone has a corresponding noise reduction module; and sending a noise reduction termination instruction to noise reduction modules of sound zones other than the target sound zone, wherein the noise reduction termination instruction is configured to instruct the noise reduction modules of the sound zones other than the target sound zone to terminate noise reduction algorithms in a process of performing voice interaction for the target sound zone.

12. The non-transitory computer-readable storage medium according to claim 11, wherein the determining, based on the voice signals obtained by the sound zones, the target sound zone to which the voice signal waking up the vehicle-mounted terminal belongs comprises:

determining, based on the voice signals obtained by the sound zones, the target sound zone to which the voice signal waking up the vehicle-mounted terminal belongs by adopting a sound zone decision algorithm.

13. The non-transitory computer-readable storage medium according to claim 11, wherein after determining the target sound zone, the method comprises:

activating a speech recognition engine of the vehicle-mounted terminal.

14. The non-transitory computer-readable storage medium according to claim 11, wherein after sending the noise reduction termination instruction to the noise reduction modules of the sound zones other than the target sound zone, the method further comprises:

in response to failing to receive a voice signal from the target sound zone within a preset time period, sending a noise reduction resume instruction to the noise reduction modules of the sound zones other than the target sound zone, wherein the noise reduction resume instruction is configured to instruct the noise reduction modules of the sound zones other than the target sound zone to restore the noise reduction algorithms.

15. The non-transitory computer-readable storage medium according to claim 11, wherein before determining the target sound zone, the method comprises:

recognizing the voice signal waking up the vehicle-mounted terminal.

* * * * *